United States Patent [19]

Fage

[11] 4,358,835

[45] Nov. 9, 1982

[54] METHOD AND DEVICE FOR MATCHING THE REFLECTOR OF AN ACOUSTIC ECHO RANGING SYSTEM

[75] Inventor: Jean-Michel Fage, Paris, France

[73] Assignee: Bertin & Cie, Plaisir, France

[21] Appl. No.: 218,827

[22] Filed: Dec. 22, 1980

[30] Foreign Application Priority Data

Dec. 27, 1979 [FR] France ............................... 79 31740

[51] Int. Cl.$^3$ ......................... G01S 7/52; G10K 11/28

[52] U.S. Cl. ................................. 367/87; 179/1 MF; 367/104; 367/902; 367/151

[58] Field of Search ..................... 367/87, 96, 99, 104, 367/902, 151; 179/1 MF

[56] References Cited

U.S. PATENT DOCUMENTS 2,274,262 2/1942 Wolff ............................. 367/902 X 3,895,188 7/1975 Ingraham ......................... 179/1 MF

*Primary Examiner*—Richard A. Farley

*Attorney, Agent, or Firm*—A. W. Breiner

[57] ABSTRACT

The reflector of an acoustic echo ranging system is matched so as to make up for the influence of the temperature at the bottom of the reflector, on the measurement of the back-reflected signal. The acoustic signal receiver being stationary the transmission frequency is controlled by a temperature responsive electronic circuit so that the receiver is always located at the same pressure antinode. Alternatively, the transmission frequency being fixed, the position of the receiver is controlled by a temperature responsive mechanical gear causing the position of the receiver to coincide with the same pressure antinode.

11 Claims, 4 Drawing Figures

METHOD AND DEVICE FOR MATCHING THE REFLECTOR OF AN ACOUSTIC ECHO RANGING SYSTEM

The remote measurement of such local meteorological parameters—as the thermal structure (such as the temperature reversing layer) or the three-dimensional vertical wind velocity profile—by meteorological stations of the SODAR or acoustic echo ranging system type, raises the problem of signal processing because of the very weak signals picked up.

Reference may be made in this connection to "Combined Radar-Acoustic Sounding System" by J. M. Marshall et al., APPLIED OPTICS, vol. 11, No. 1, January 1972, pages 108-112.

The reflectors employed in acoustic remote detection systems are generally of the parabolic type and consist of a paraboloid extended by a hood lined internally with sound absorbent material, the back-reflected signals being picked up in the exit plane of an acoustic horn fitted on the axis of the paraboloid. While this type of reflector has a high gain, it has as a counterpart the drawback of generating interference fringes between the bottom of the paraboloid and the exit plane of the horn, at the scale of half the acoustic wavelength. This results in an reflector frequency transfer function in the form of a sinusoid.

The transmitting frequency being selected as a function of the range, the focal point of the reflector will be located near a pressure antinode for a given reference temperature To (15° C. for example) if the focal length of the paraboloid is a certain whole multiple of half the acoustic wavelength. In such cases, there will indeed be a pressure antinode at the focal point, where the horn exit plane preferably lies.

For a given transmitting frequency, this condition obviously depends on the wavelength and hence on the air temperature T at the bottom of the parabolic reflector. In other words, for a given position of the pick-up element along the axis of the paraboloid, the latter will register, for a given signal entering the reflector, amplitudes which differ according to the temperature T at the time, since the pattern of interference fringes being established expands or contracts as the temperature increases or decreases.

The present invention relates to an automatic reflector matching method and to the means of implementation thereof whereby the reflector is able to follow variations in said interference fringes as a function of temperature T in such a manner that signals are always registered near the same pressure antinode. In a preferred embodiment of the subject method of this invention, the transmitting frequency remains fixed and signals are registered in the exit plane of a horn which is movable along the axis of the paraboloid, displacement of the horn taking place in compliance with a law as a function of $T^{-\frac{1}{2}}$ corresponding to the theoretical shift in the standing-wave pattern.

Relative variation ΔX of the abscissa Xo of the pressure antinode may then be expressed as a function of temperature variations ΔT as follows:

$$\Delta X/Xo = \tfrac{1}{2} \times (\Delta T/To)$$

Shift of the horn exit plane in compliance with this law is preferably controlled by the movement of the rod of a hydraulic jack, the oil reservoir of which would serve as temperature sensor.

In an alternative embodiment, the horn exit plane remains stationary—at the focal point, say—and the transmitting frequency is modified in compliance with a law as a function of $T^{-\frac{1}{2}}$, corresponding to the theoretical shift in the pattern of interference fringes, whereby the pressure antinode remains fixed in position regardless of temperature variations. The relative variation Δf in frequency fo equal to the relative variation Δλ in wavelength λo may then be expressed as a function of variation in temperature as follows:

$$\Delta f/fo = \Delta\lambda/\lambda o = \tfrac{1}{2} \times (\Delta T/To)$$

The temperature variations registered by a sensor located between the bottom of the parabolic reflector and the horn exit plane are converted by an adequate electronic circuit into voltage variations, which are in turn converted into frequency variations by a conventional voltage/frequency converter.

In this instance, the passband of the filter having its center frequency equal to the transmitting frequency will be fixed in a first version, the relative passband Δf/fo being such as to enable the signal to be filtered without attenuation over a pre-established temperature range such that:

$$\Delta f/fo > \tfrac{1}{2}\Delta T/To$$

In an alternative version, the filter passband remains centered upon the transmitting frequency and follows its variations by means of a follow-up system, and in this case the filter is of the digital type.

The description that follows with reference to the accompanying drawings of two alternative embodiments of the invention will give a clear understanding of how the same can be carried into practice.

Figure 1:
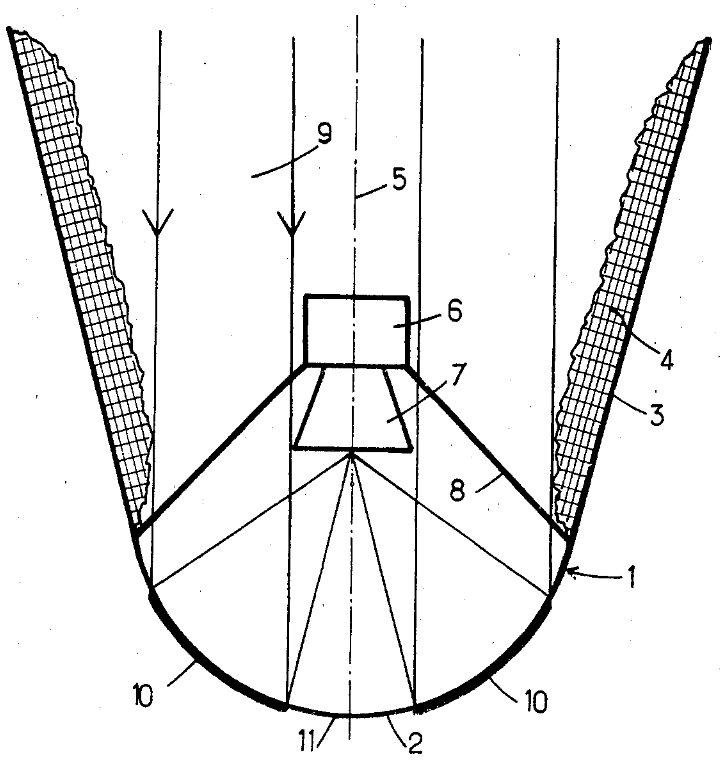
FIG. 1 is a diagrammatic axial section through a conventional reflector.

Referring to FIG. 1, there is schematically illustrated thereon the reflector 1 of an acoustic echo ranging system formed by a parabolic reflector surface 2 extended by a hood 3 lined internally with sound absorbent material 4. A transmission chamber 6, such as a compression chamber, extended by a horn 7, is maintained in the axis 5 of reflector 1 and made fast therewith by rigid connecting means 8 such as a tripod. The figure shows a theoretical beam 9 of back-reflected sound waves that determine the effective area 10 of reflector 1. The sound waves generated by transmission chamber 6 in theory follow the reverse path. The surface portion 11 lying on the paraboloid axis 5 is partially masked by the presence of the transmission and reception system.

Figure 2:
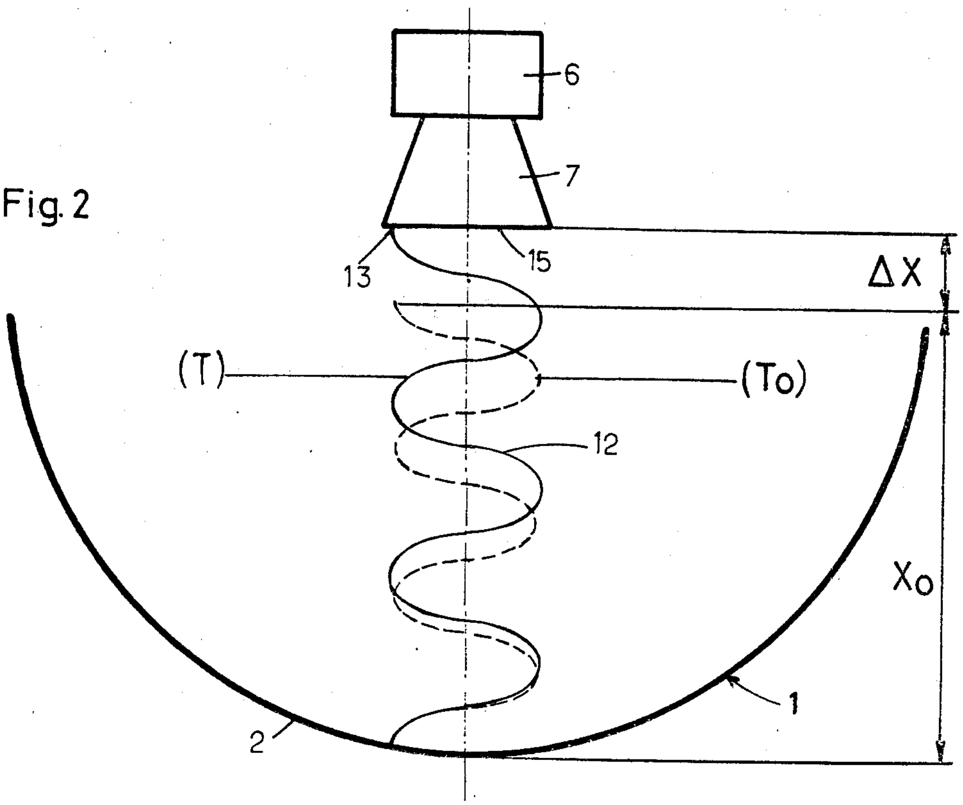
FIG. 2 is a diagrammatic illustration of the phenomenon of interference fringes established between the bottom of the paraboloid and the exit plane of the horn.

FIG. 2 shows a diagrammatic illustration of the shift in the interference fringe pattern 12 as a function of the temperature T. The pressure antinode 13 is located at the focal point, at abscissa Xo, and shifts through ΔX in response to a temperature $T = To + \Delta T$, the exit plane 15 of horn 7 shifting by the same theoretical amount:

$$\Delta X = Xo \times \tfrac{1}{2} \Delta T/To$$

Figure 3:
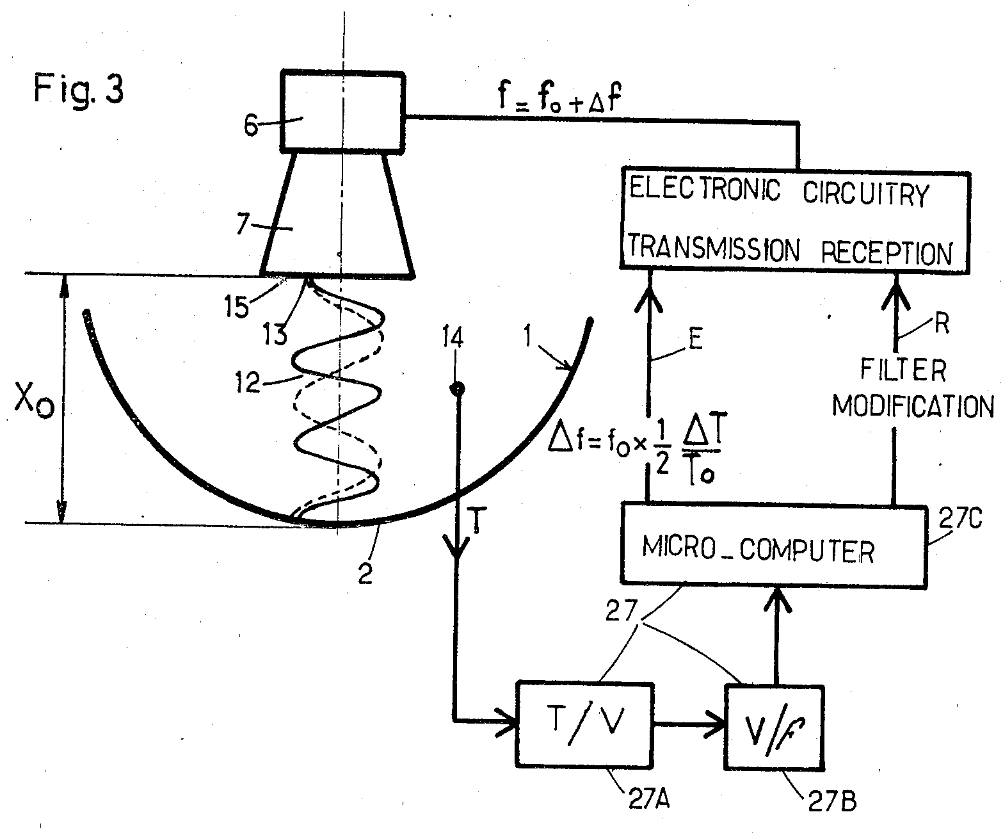
FIG. 3 is a synoptic illustration of an reflector matching system using electronic means.

FIG. 3 diagrammatically illustrates the electronic matching means for the reflector 1. The exit plane 15 of horn 7 is located at the focal point of the paraboloid, at abscissa Xo, and the transmission frequency f is modified to compensate for the theoretical variation with temperature of the pattern of interference fringes. The re-establishing of pressure antinode 13 at abscissa Xo causes a frequency change Δf with respect to the frequency fo such that:

$$\Delta f = fo \times \tfrac{1}{2} \Delta T/To$$

The various stages in the conversion of the indication of temperature T in °K. given by temperature sensor 14 are symbolized by blocks 27. The change in temperature T is converted in a conventional electronic circuit 27A into a change in voltage V which is in turn converted into a change in frequency f by a conventional voltage/frequency converter 27B. This change in frequency is processed in a microcomputer 27C that reacts at transmission level E by modifying the frequency and at reception level R by so modifying the filters as to cause their center frequencies to correspond invariably with the transmission frequency.

Figure 4:
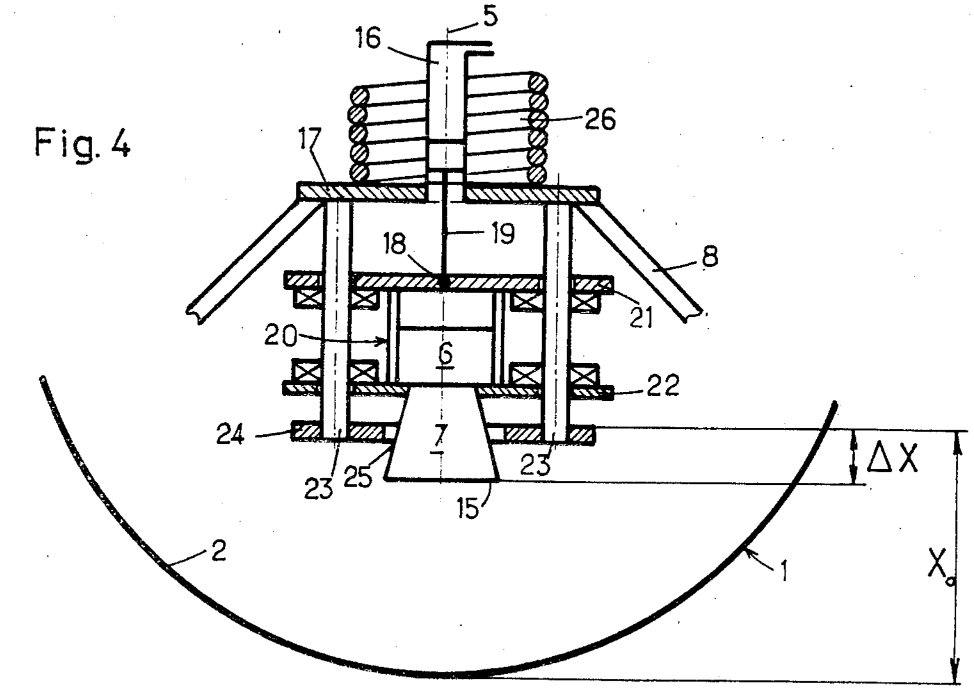
FIG. 4 is a diagrammatic illustration of an alternative reflector matching system using mechanical means.

FIG. 4 shows the mechanical system for matching the reflector 1 whereby the plane 15 of the mouth of horn 7 can be shifted in accordance with the theoretical law of evolution of the pattern of interference fringes with the temperature. Said mechanical system includes a hydraulic jack 16 disposed along the axis 5 of the paraboloid 2 and supported on a fixed base 17. The end 18 of jack rod 19 is fast with an assembly 20 which is movable along the paraboloid axis 5 and which comprises transmission chamber 6 extended by horn 7. The whole assembly is supported by a frame formed by two parallel plates 21 and 22 sliding along vertical guides or columns 23 supported by fixed base 17, which base is rigidly connected to the paraboloid structure 2 by tripod system 8.

Columns 23 have their lower parts rigidly interconnected by a plate 24 having formed therein a circular opening 25 for free passage of movable assembly 20. The chamber of hydraulic jack 16 communicates with a coil 26 made of copper or any other good heat conducting material that forms the temperature sensor shown diagrammatically at 14 on FIG. 3. The total volume of 16 and 26 is such that, for a variation ΔT in temperature at the level of horn 7, the rod 19 of jack 16 moves through the required distance:

$$\Delta X = Xo \times \tfrac{1}{2} \Delta T/To$$

I claim:

1. In an acoustic echo ranging system having a reflector paraboloid and designed for transmitting an acoustic signal towards a target, receiving the resulting echo signal and processing said signals for data acquirement, a method of matching the reflector in order to improve the quality of reception of said echo signal as picked up by a horn having an exit plane which, under optimum echo signal reception conditions, lies adjacent the focal point of said paraboloid, the focal length of which is a whole multiple of half the transmitted wavelength, this multiple being a characteristic of the configuration of said paraboloid whose reception conditions are upset by the appearance of a pattern of interference fringes which is established naturally between the bottom of the paraboloid and the horn and which evolves with the temperature prevailing at the bottom of the reflector, wherein the improvement comprises the step of automatically correcting this evolution in the pattern of interference fringes by an adjustment dependent on said temperature whereby the position of the exit plane of the horn is caused to coincide with the same pressure antinode located as being spaced from the bottom of the paraboloid by said multiple of the half-wavelength.

2. An acoustic echo ranging system of the kind designed for transmitting an acoustic signal towards a target, receiving the corresponding echo signal retrodiffused by said target and processing said signals for data acquirement, said system comprising the combination of:

(i) a sound reflector having the shape of a paraboloid, the focal length of which is a whole multiple of half the transmitted wavelength, this multiple being a characteristic of the configuration of said paraboloid whose reception conditions are upset by the appearance of a pattern of interference fringes which is established naturally between the bottom of the paraboloid and the focal point thereof and which evolves with the temperature prevailing at the bottom of the paraboloid, (ii) a sound pick-up horn having an exit plane which, under optimum echo signal reception conditions, lies adjacent said focal point, and (iii) a temperature sensor positioned adjacent said horn for causing said exit plane to coincide with the same pressure antinode located as being spaced from the bottom of the paraboloid by said multiple of the half-wavelength, whereby the evolution in said pattern of interference fringes is automatically corrected by an adjustment dependent on said temperature.

3. A system as claimed in claim 2, wherein the horn is stationary and the exit plane thereof is at a fixed location adjacent the focal point of the paraboloid, said system comprising electronic means under the control of the temperature sensor for modifying the transmission frequency to perform said adjustment.

4. A system as claimed in claim 2, wherein the transmission frequency is fixed and the exit plane of the horn is adjustable along the axis of the paraboloid under the control of a mechanism, itself under the control of the temperature sensor.

5. A system as claimed in claim 3, in which the temperature variations ΔT about a reference temperature To, as registered by said sensor, are converted by an electronic circuit into voltage variations which are themselves converted into frequency variations by a voltage/frequency converter, the frequency excursion ΔF with respect to the reference transmission frequency Fo being required to meet the relation:

$$\Delta F = Fo \times \tfrac{1}{2} \Delta T/To.$$

6. A system as claimed in claim 5, comprising echo signal analyzing filters having controllable center frequencies, and transmission frequency follower means for causing said center frequencies to continuously register with the transmission frequency.

7. A system as claimed in claim 5, comprising echo signal analyzing filters having fixed passbands such that the relative passband $\Delta F/Fo$ allows the echo signal to be restored without attenuation over a fixed temperature range $\Delta T$ such that $\Delta F/Fo > \frac{1}{2}\Delta T/To$.

8. A system as claimed in claim 4, in which the variations in temperature $\Delta T$ about a reference temperature To, as registered by said sensor, are converted by said mechanism into a displacement of the plane of the exit plane of the horn along the paraboloid axis, the variation $\Delta X$ in abscissa value with respect to the abscissa value Xo of the focal point being required to meet the relation:

$$\Delta X = Xo \times \tfrac{1}{2}\Delta T/To.$$

9. A system as claimed in claim 4, in which the mechanism includes a hydraulic jack controlled by the temperature sensor.

10. A system as claimed in claim 9, in which the jack is disposed along the paraboloid axis and supported on a fixed base, the end of the rod of said jack being fast with an assembly which is movable along the paraboloid axis and comprises a transmission chamber extended by the horn, the complete assembly being supported by a fixed frame rigidly connected to the paraboloid structure.

11. A system as claimed in claim 9, in which the jack chamber communicates with a coil which surrounds said jack and forms the temperature sensor, the total volume of said jack and coil being such that, for a temperature variation $\Delta T$, the jack rod moves through the required distance $\Delta X$.

* * * * *